No. 687,460. Patented Nov. 26, 1901.
J. KOTLER.
STRIP POINT SETTING FOR JEWELRY.
(Application filed June 28, 1900.)

(No Model.)

WITNESSES, INVENTOR,
Geo. O. Carleton Jake Kotler
Frederick S. Boucette BY H. W. Boardman
ATT'Y.

UNITED STATES PATENT OFFICE.

JAKE KOTLER, OF PROVIDENCE, RHODE ISLAND, ASSIGNOR TO SUMMER KOTLER AND SCHEINER, OF PROVIDENCE, RHODE ISLAND, A COPARTNERSHIP.

STRIP POINT-SETTING FOR JEWELRY.

SPECIFICATION forming part of Letters Patent No. 687,460, dated November 26, 1901.

Application filed June 28, 1900. Serial No. 21,900. (No model.)

*To all whom it may concern:*

Be it known that I, JAKE KOTLER, a citizen of the United States, residing at Providence, in the county of Providence and State of Rhode Island, have invented a new and useful Strip Point-Setting for Jewelry, of which the following is a specification.

My invention relates to improvements in strip point-setting for jewelry; and the objects of my improvements are, first, to make a continuous connected strip of point-setting; second, to make a uniform and substantial setting; third, to make a setting in one piece, avoiding soldering of pieces together to make a continuous strip or otherwise connecting the several parts, and, fourth, to make a setting equally as good or better than hand-setting for less money. I attain these objects by the mechanism illustrated in the accompanying drawings, of which—

Figure 1:
Figure 4:
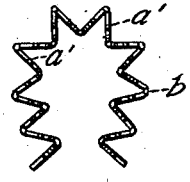
Figure 2:
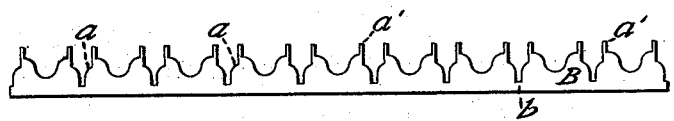
Figure 5:
Figure 6:
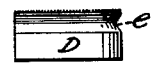
Figure 3:
Figure 7:
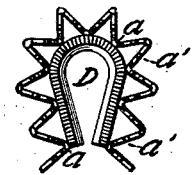

Figure 1 is a strip of metal from which I make my strip-setting. Fig. 2 is an elevation of said strip-setting after it is cut or punched. Fig. 3 is a plan view of said strip-setting after it is cut and corrugated. Fig. 4 is a strip bent for use in setting stones in jewelry. Figs. 5 and 6 are views of a core around which the strip is placed to hold the stones in the setting. Fig. 7 shows a core set in a strip.

Similar letters refer to similar parts throughout the several views.

A, Fig. 1, represents a strip of plate cut of the right width and thickness, from which I make my strip-setting. B, Fig. 2, shows said strip-setting after it is cut or punched by dies in a press to form part of the seat $a$ for the jewel to be set and the points $a'$ $a'$, which are bent against or over the edge of the stone or jewel to hold it in the setting.

C shows the strip-setting corrugated to bring the points $a'$ in proper position to engage and hold the stone in place. The strip is punched or cut away deeper at $b$ to allow of easier bending, to save stock, and to make lighter the setting. In cutting the strip part $a$ is cut at an obtuse angle or rounded, so that when it is corrugated its folds will form a seat for the jewel to rest on, and the part $a'$ is cut at an acute angle or point, so that this point can be easily folded over the jewel when set to retain it in place, each alternate cut being one of the obtuse angle and the other of the acute angle. The strip being thus cut forms one continuous series of seats and points, and when corrugated forms the seats for the jewels to rest on and the points to hold the jewels in place. Heretofore when several seats and points were made separately they had to be soldered together.

D shows the core, having a groove or channel $e$ around its periphery to form a seat for the stone to rest on.

The process of making my setting consists in first cutting a strip of metal to be used of the right width, after which I pass it through a die having a proper cutter or punch, which cuts out the surplus stock, leaving the strip with the proper seat and points of the right shape and at the proper place or position, as shown in Fig. 2. I next pass said strip through another properly-formed die, which bends or corrugates it, as shown in Fig. 3. It is then ready for use. The stone in being set is placed one edge in the groove of the core, while the other edge rests on the seat of the setting, and the points are bent or folded over the stone to secure it to the setting.

I do not make claim for strip-setting cut and corrugated to form seats and points generally, as such have been made by Costigan, Schill, and others of record in this case; but I do claim my specific invention shown and described herein, as hereinafter specified in the claim.

I claim—

The herein shown and described continuous strip cut from one piece having projections at regular intervals, said projections terminating in a point the limiting side lines of the point having a less inclination to each other than the limiting side lines of the base of the projection the strip being corrugated so that the folds will bring the bases of the projections in position to form seats for the jewel to properly rest on, and bring the points in relative positions to fold over the jewel to hold it in place.

JAKE KOTLER.

Witnesses:
H. W. BOARDMAN,
GEO. P. CARLETON.